US012271598B2

(12) United States Patent
Jiang et al.

(10) Patent No.: US 12,271,598 B2
(45) Date of Patent: Apr. 8, 2025

(54) METHOD, DEVICE AND COMPUTER PROGRAM PRODUCT FOR TRANSFERRING DATA

(71) Applicant: Dell Products L.P., Round Rock, TX (US)

(72) Inventors: Changxu Jiang, Chengdu (CN); Chen Gong, Beijing (CN); Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/215,411

(22) Filed: Jun. 28, 2023

(65) Prior Publication Data

US 2024/0211143 A1 Jun. 27, 2024

(30) Foreign Application Priority Data

Dec. 22, 2022 (CN) .......................... 202211659305.4

(51) Int. Cl.
*G06F 3/06* (2006.01)
(52) U.S. Cl.
CPC ............ *G06F 3/0613* (2013.01); *G06F 3/064* (2013.01); *G06F 3/068* (2013.01)
(58) Field of Classification Search
CPC ........ G06F 3/0613; G06F 3/064; G06F 3/068; G06F 3/0649; G06F 3/061; G06F 3/0685; G06F 3/0647
See application file for complete search history.

(56) References Cited

U.S. PATENT DOCUMENTS

| 9,952,808 | B2 | 4/2018 | Kaushik | |
|---|---|---|---|---|
| 9,996,270 | B2 | 6/2018 | Guo et al. | |
| 10,481,820 | B1* | 11/2019 | Dunbar | G06F 3/0608 |
| 2018/0341423 | A1* | 11/2018 | Hori | G06F 3/0611 |
| 2021/0035649 | A1* | 2/2021 | Muchherla | G06F 3/0619 |
| 2021/0157593 | A1* | 5/2021 | Gu | G06F 9/5027 |
| 2021/0191880 | A1* | 6/2021 | Ki | G06F 12/1408 |
| 2022/0091738 | A1 | 3/2022 | Patil et al. | |
| 2022/0236901 | A1* | 7/2022 | Rao | G06F 3/0611 |

\* cited by examiner

*Primary Examiner* — Nicholas Klicos
*Assistant Examiner* — Julian S Mendel
(74) *Attorney, Agent, or Firm* — BainwoodHuang

(57) ABSTRACT

Techniques for transferring data involve: determining a first physical block in a first storage device, the first physical block having a plurality of data blocks stored thereon. The techniques further involve: determining, based on a first data block of the plurality of data blocks, whether a set of logically contiguous data blocks that comprise the first data block exist in the first physical block, the set of data blocks having a target heat greater than a threshold heat. The techniques further involve: transferring, in response to the existence of the set of data blocks in the first physical block, the set of data blocks into a second storage device for contiguous storage in a second physical block of the second storage device. Accordingly, relatively high heat data blocks are transferred to device with higher access speed, thereby reducing data access time, increasing data processing efficiency, and improving user experience.

20 Claims, 6 Drawing Sheets

METHOD, DEVICE AND COMPUTER PROGRAM PRODUCT FOR TRANSFERRING DATA

CROSS-REFERENCE TO RELATED APPLICATION

This application claims priority to Chinese Patent Application No. CN202211659305.4, on file at the China National Intellectual Property Administration (CNIPA), having a filing date of Dec. 22, 2022, and having "METHOD, DEVICE AND COMPUTER PROGRAM PRODUCT FOR TRANSFERRING DATA" as a title, the contents and teachings of which are herein incorporated by reference in their entirety.

TECHNICAL FIELD

Embodiments of the present disclosure generally relate to the field of data processing, and in particular, to a method, a device, and a computer program product for transferring data.

BACKGROUND

With the development of technology, more and more high-performance storage devices, such as solid-state drives (SSDs), are used to store data. Although high-performance storage devices can improve the access efficiency of data and reduce access time, high-performance storage devices are costly. In order to balance cost and access speed, more and more hybrid storage systems are used to provide data storage services to users.

Hybrid storage systems have hybrid types of drives: low-performance high-capacity lower-level storage devices, such as hard disk drives (HDDs), and high-performance upper-level storage devices, such as flash memories or SSDs. While hybrid storage systems can well balance cost and processing rates for users, there are many issues that need to be addressed in the process of working with hybrid storage systems.

SUMMARY OF THE INVENTION

Embodiments of the present disclosure provide a method, a device, and a computer program product for transferring data.

According to a first aspect of the present disclosure, a method for transferring data is provided. The method includes: determining a first physical block in a first storage device, the first physical block having a plurality of data blocks stored thereon. The method further includes: determining, based on a first data block of the plurality of data blocks, whether a set of logically contiguous data blocks that include the first data block exist in the first physical block, the set of data blocks having a target heat greater than a threshold heat. The method further includes: transferring, in response to the existence of the set of data blocks in the first physical block, the set of data blocks into a second storage device for contiguous storage in a second physical block of the second storage device.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: determining a first physical block in a first storage device, the first physical block having a plurality of data blocks stored thereon; determining, based on a first data block of the plurality of data blocks, whether a set of logically contiguous data blocks that include the first data block exist in the first physical block, the set of data blocks having a target heat greater than a threshold heat; and transferring, in response to the existence of the set of data blocks in the first physical block, the set of data blocks into a second storage device for contiguous storage in a second physical block of the second storage device.

According to a third aspect of the present disclosure, a computer program product is provided, which is tangibly stored on a non-volatile computer-readable medium and includes machine-executable instructions, wherein the machine-executable instructions, when executed, cause a machine to perform steps of the method in the first aspect of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Figure 1:
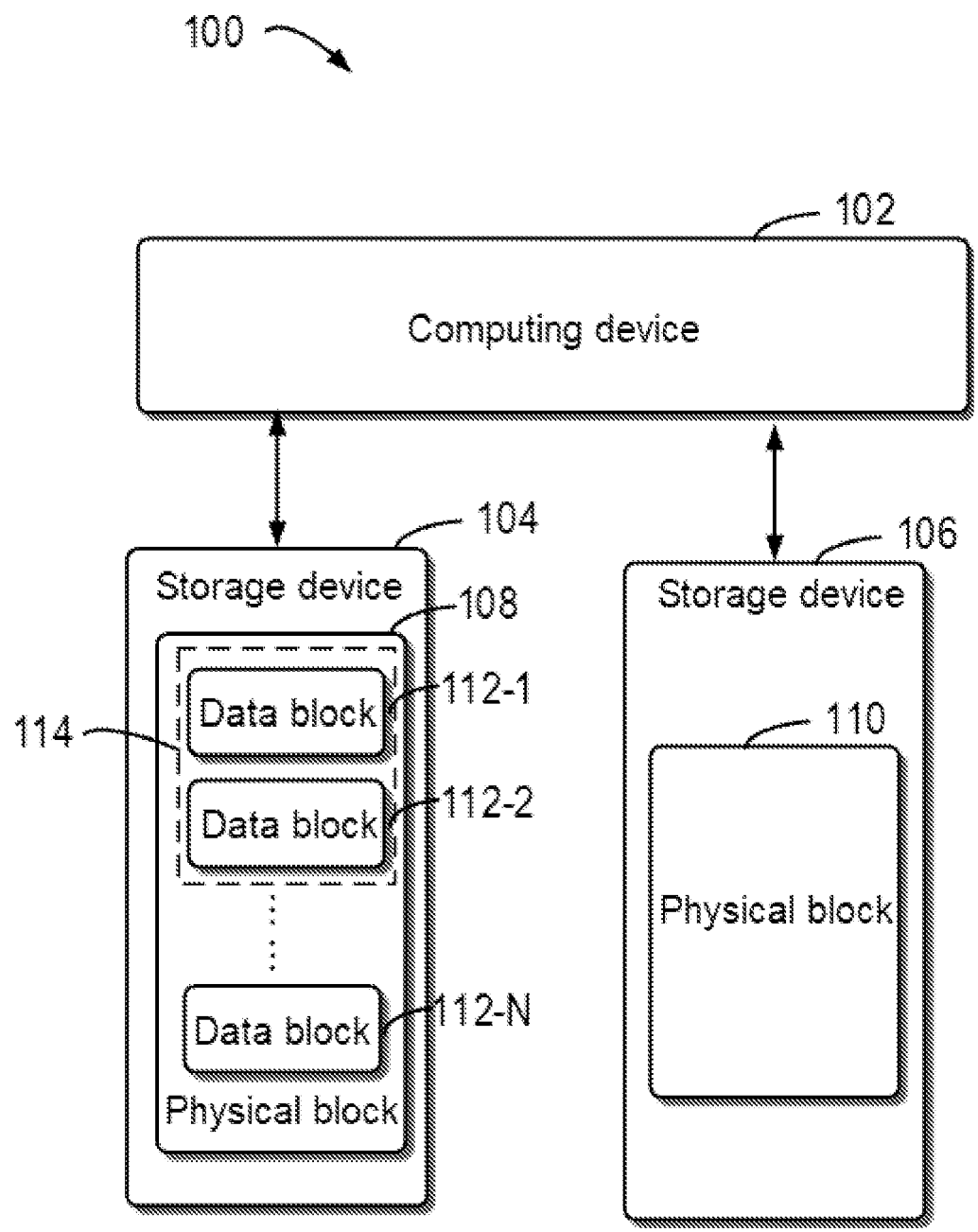
FIG. 1 illustrates a schematic diagram of an example environment in which a device and/or a method according to embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of the embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, hybrid storage systems that include storage devices with different device access speeds are increasingly applied to storage of data. When an upper-level storage device does not have sufficient capacity, user data should be moved out from the upper-level storage device to a lower-level storage device to make room for hotter data and metadata, as well as newly received written data. However, it sometimes happens that data that has been previously written to a lower-level storage device is frequently accessed by a computing device. In existing conventional solutions, it is difficult to transfer data stored in a lower-level storage device back to an upper-level storage device. This situation causes a poor user experience when certain data blocks stored in lower-level storage devices are frequently accessed, as the user takes a long time to acquire the data in these lower-level storage devices due to the long device access time of the lower-level storage devices.

At least to address the above and other potential problems, an embodiment of the present disclosure provides a method for transferring data. A computing device first determines a physical block in a first storage device from which data is to be transferred. The computing device then determines whether a set of logically contiguous data blocks exist in that physical block based on data blocks in that physical block. In the case of existence, data is transferred in groups to an upper-level storage device based on the heat of the set of data blocks; and in the case of absence, separate decisions are made for the data blocks to determine whether to transfer them into the upper-level storage device. With this method, data blocks with a relatively high heat are transferred from a storage device with a low access speed into a storage device with a high access speed, thereby reducing data access time, increasing data processing efficiency, and improving user experience.

The embodiments of the present disclosure will be further described in detail below with reference to the accompanying drawings, wherein FIG. 1 shows an example environment in which a device and/or a method according to an embodiment of the present disclosure can be implemented.

As shown in FIG. 1, example environment 100 includes computing device 102, wherein computing device 102 may be used to manage or control the transfer of data between storage device 104 and storage device 106. For example, computing device 102 is used to transfer data to be transferred from storage device 104 to storage device 106. Example computing device 102 includes, but is not limited to, a personal computer, a server computer, a handheld or laptop device, a mobile device, a multiprocessor system, a consumer electronic product, a minicomputer, a mainframe computer, a distributed computing environment including any of the above systems or devices, and the like. When using storage devices 104 and 106, storage device 104 may be used as a lower-level storage device, and storage device 106 may be used as an upper-level storage device.

Storage device 104 may also be referred to as a first storage device, which is a low-performance storage device with a long device access time. For example, storage device 104 has a longer device access time relative to storage device 106. For example, storage device 104 may be an HDD. The above examples are only intended to describe the present disclosure, and are not intended to specifically define the present disclosure. Storage device 104 includes physical block 108, and physical block 108 includes data blocks 112-1, 112-2, . . . , and 112-N, with N being a positive integer, which may also be referred to as data blocks 112 for description convenience. FIG. 1 illustrates storage device 104 including one physical block 108, which is only an example and not a specific limitation to the present disclosure, and storage device 104 may include any number of physical blocks.

Computing device 102 may check physical blocks in storage device 104 according to a certain policy to determine whether the data blocks included within this physical block are to be transferred to storage device 106. In one example, computing device 102 is configured to check at a certain time period whether data in physical block 108 in storage device 104 needs to be transferred to storage device 106. In another example, computing device 102 is configured to check, when there is a light service load, whether data in the physical block in storage device 104 needs to be transferred to storage device 106. The above examples are only intended to describe the present disclosure, and are not intended to specifically define the present disclosure.

Computing device 102, after starting to look for physical blocks based on certain policy configurations, finds from a plurality of physical blocks in storage device 104 a physical block that meets certain criteria to perform transfer of data blocks. For example, it is determined, using the heat of the physical block, whether data blocks in that physical block need to be transferred. If physical block 108 is selected as the physical block from which data blocks are to be transferred, it is checked, starting from the first data block in data blocks 112, whether there is a data block in that physical block that is logically contiguous with the data block. If there is, computing device 102 determines, from the physical block according to the heat of the data block, a set of data blocks that include the data block. At this point, it is necessary to ensure that the heat of the set of data blocks is greater than a threshold heat and transfer the set of data blocks together into storage device 106. For case of description, this threshold heat is also referred to as a first threshold heat. As shown in FIG. 1, for example, if the average heat of data blocks 112-1 and 112-2 is greater than the first threshold heat, the two data blocks form a set of data blocks 114. This set of data blocks 114 are then transferred together to physical block 110 in storage device 106. If the first data block does not include a contiguous data block, a separate decision is made for the data block to determine whether its heat is greater than another threshold heat. If the heat of the data block alone is greater than that another threshold heat, that data block is transferred to storage device 106. If the heat of the data block is not greater than the another threshold heat, it is further determined, based on whether the data block is in a de-duplication hash table, whether to transfer this data block. After the decision is made for that data block, decisions are then made for other unprocessed data blocks in physical block 108 until all data blocks in physical block 108 are processed.

Storage device 106 is also referred to as a second storage device, which is composed of a high-performance storage device and has a short device access time. For example, storage device 106 may be a flash memory or an SSD. Storage device 106 includes physical block 110. FIG. 1 illustrates storage device 106 including one physical block 110, which is only an example and not a specific limitation to the present disclosure. Storage device 104 may include any suitable number of physical blocks.

With this method, data blocks with a relatively high heat are transferred from a storage device with a low access speed into a storage device with a high access speed, thereby reducing data access time, increasing data processing efficiency, and improving user experience.

Figure 2:
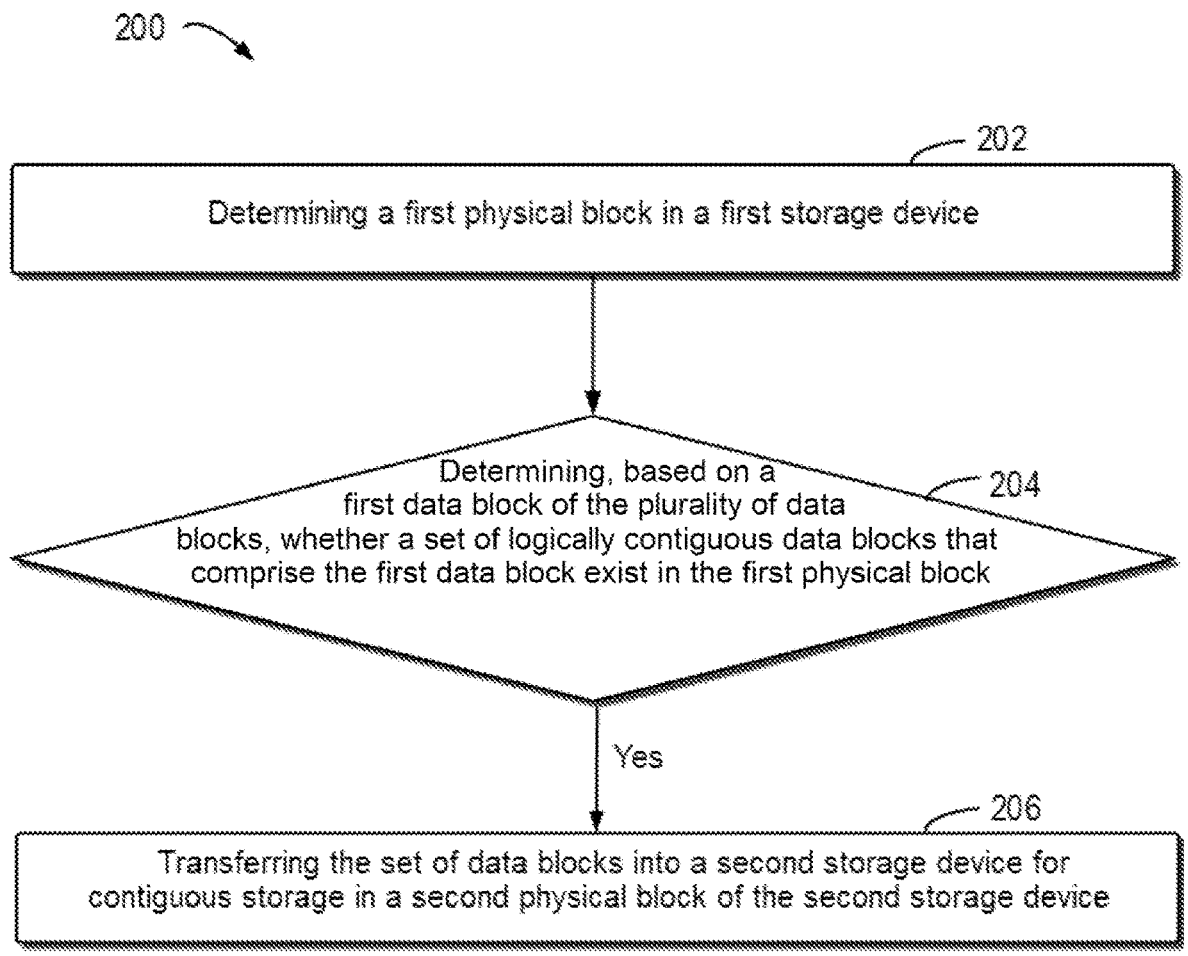
FIG. 2 illustrates a flow chart of a method for transferring data according to an embodiment of the present disclosure.

While an example environment in which a device and/or a method of embodiments of the present disclosure may be implemented is described above in conjunction with FIG. 1, a flow chart of method 200 for transferring data according to an embodiment of the present disclosure will be described below in conjunction with FIG. 2. The method in FIG. 2 may be performed on computing device 102 in FIG. 1 or any suitable computing device.

At block 202, a first physical block in a first storage device is determined. The first physical block is a target physical block determined from a plurality of physical blocks in the first storage device to be used for transferring data blocks, with a plurality of data blocks, such as a plurality of data blocks 112, stored thereon. Data blocks in the first physical block may be transferred into a higher-performance storage device. For example, the first storage device has a longer device access time than the second storage device to which the data is to be transferred.

In some embodiments, the computing device determines the first physical block according to the heat of a data block in the physical block. In this process, the computing device first determines the heat of a data block in a candidate physical block in the first storage device, where the heat indicates how frequently the data block is accessed. The heat may be expressed, for example, using the number of times the data is accessed. The computing device then determines a second heat of the candidate physical block according to the heat of the data block, where the second heat indicates how frequently the candidate physical block is accessed. In one example, the computing device determines the heat of the candidate physical block based on an average value of the heats of all the data blocks within the candidate physical block. In another example, the computing device determines the heat of the candidate physical block based on the sum of the heats of all the data blocks within the candidate physical block. The above examples are only intended to describe the present disclosure, and are not intended to specifically define the present disclosure.

Computing device 102 also needs to compare the heat of the candidate physical block with a second threshold heat. When the heat of the candidate physical block is determined to be greater than the second threshold heat, it indicates that this candidate physical block is frequently used, then the candidate physical block needs to be determined as the first physical block from which data is to be transferred in order to transfer the data therein into an upper-level storage device to speed up the data access. If the heat of the candidate physical block is not greater than the second threshold heat, it indicates that the data in this candidate physical block is not hot, and the data within that physical block does not need to be processed. In this way, it can be quickly determined which candidate physical blocks need to be processed.

At block 204, it is determined, based on a first data block of the plurality of data blocks, whether a set of logically contiguous data blocks that include the first data block exist in the first physical block. Here, the determined set of data blocks has a target heat greater than a threshold heat. For example, the computing device may determine whether a set of data blocks with a relatively high heat exists in physical block 108 in storage device 104.

In some embodiments, when determining the set of data blocks, computing device 102 first acquires a first data block and then determines, based on metadata of the first data block, whether a second data block that is logically contiguous with the first data block exists in the first physical block. If determining that the second data block exists in the first physical block, computing device 102 next acquires the set of logically contiguous data blocks that include the first data block in the first physical block.

In some embodiments, when acquiring the set of data blocks, the computing device adds the first data block to the set of data blocks. Computing device 102 also uses the first data block as the head and tail for determining the set of data blocks. Next, computing device 102 looks for the second data block that is logically contiguous with the first data block and then moves the tail to that second data block. The computing device determines a reference heat for the set of data blocks and the second data block according to a heat of a data block in the set of data blocks and a heat of the second data block, for example, by calculating an average heat of those data blocks. Computing device 102 further determines whether this reference heat is greater than a threshold heat, which may also be referred to as a first threshold heat. If the reference heat is not greater than the first threshold heat, the second data block is not added to the set of data blocks, and the selection of data blocks in the set of data blocks is ended, at which point the set of data blocks do not include the data block in which the tail is located. The set of data blocks are then transferred to the second storage device, and the head is transferred to the second data block corresponding to the tail. If the reference heat is greater than the first threshold heat, the computing device adds the second data block to the set of data blocks. It is then determined whether a data block contiguous with the second data block can be acquired. If no data block contiguous with the second data block is acquired, the selection of data blocks in the set of data blocks is ended, and then the transfer of data is performed; and if a data block contiguous with the second data block is acquired, the tail is moved to the data block contiguous with that second data block, the heat of the set of data blocks and the data block contiguous with the second data block is determined next, and this heat is then compared with the first threshold heat to determine whether to add that contiguous data block to the set of data blocks. The above operation is also performed later.

In some embodiments, the computing device needs to determine the heat of this set of data blocks. The computing device first determines a heat of each data block in the set of data blocks. An average value of the set of heats of the set of data blocks is then determined as the target heat. The above examples are intended to describe the present disclosure only and are not a limitation to the present disclosure, and any other suitable approaches may be used by a person skilled in the art to determine the heat of the set of data blocks.

If the set of data blocks exist in the first physical block, at block 206, the computing device transfers the set of data blocks into a second storage device for contiguous storage in a second physical block of the second storage device.

In some embodiments, if the set of data blocks does not exist in the first physical block, the computing device makes separate decisions for the data blocks. The computing device first determines the heat of the first data block, which is also referred to as a third heat for case of description. The computing device then determines whether the third heat is greater than a third threshold heat. If the third heat is greater than the third threshold heat, the first data block is transferred to the second storage device. If the third heat is smaller than or equal to the third threshold heat, it is also necessary to determine whether a target hash value of the first data block is in a de-duplication hash table, so as to determine whether to transfer the first data block to the second storage device. In one example, the computing device first calculates the target hash value of the first data block. The target hash value is then compared with the de-duplication hash table to determine whether the target hash value is in the de-duplication hash table, wherein the de-duplication hash table stores hash values of data blocks that can be deduplicated. If the target hash value is in the de-duplication hash table, it is determined whether an adjusted value of the third heat is greater than the third threshold heat. Alternatively, the adjusted value is obtained by amplifying the third heat by a predetermined multiple. If the adjusted value of the third heat is greater than the third threshold heat at this point, the first data block is transferred into the second storage device. If the target hash value is not in the de-duplication hash table or the adjusted value of the third heat is smaller than or equal to the third threshold heat, the first data block is not transferred into the second storage device. In this way, as many data blocks with a high heat as possible can be transferred to an upper-level storage device.

Further, after the first data block is transferred to the second storage device, the computing device also updates the de-duplication hash table using the location of storage of the first data block in the second storage device.

With this method, data blocks with a relatively high heat can be transferred from a storage device with a low access speed into a storage device with a high access speed, thereby reducing data access time, increasing data processing efficiency, and improving user experience.

The method for transferring data has been described above in conjunction with FIG. 2, and a flow chart of example 300 for transferring data according to an embodiment of the present disclosure is described below in conjunction with FIG. 3. The method in FIG. 3 may be performed on computing device 102 in FIG. 1 or any suitable computing device.

Figure 3:
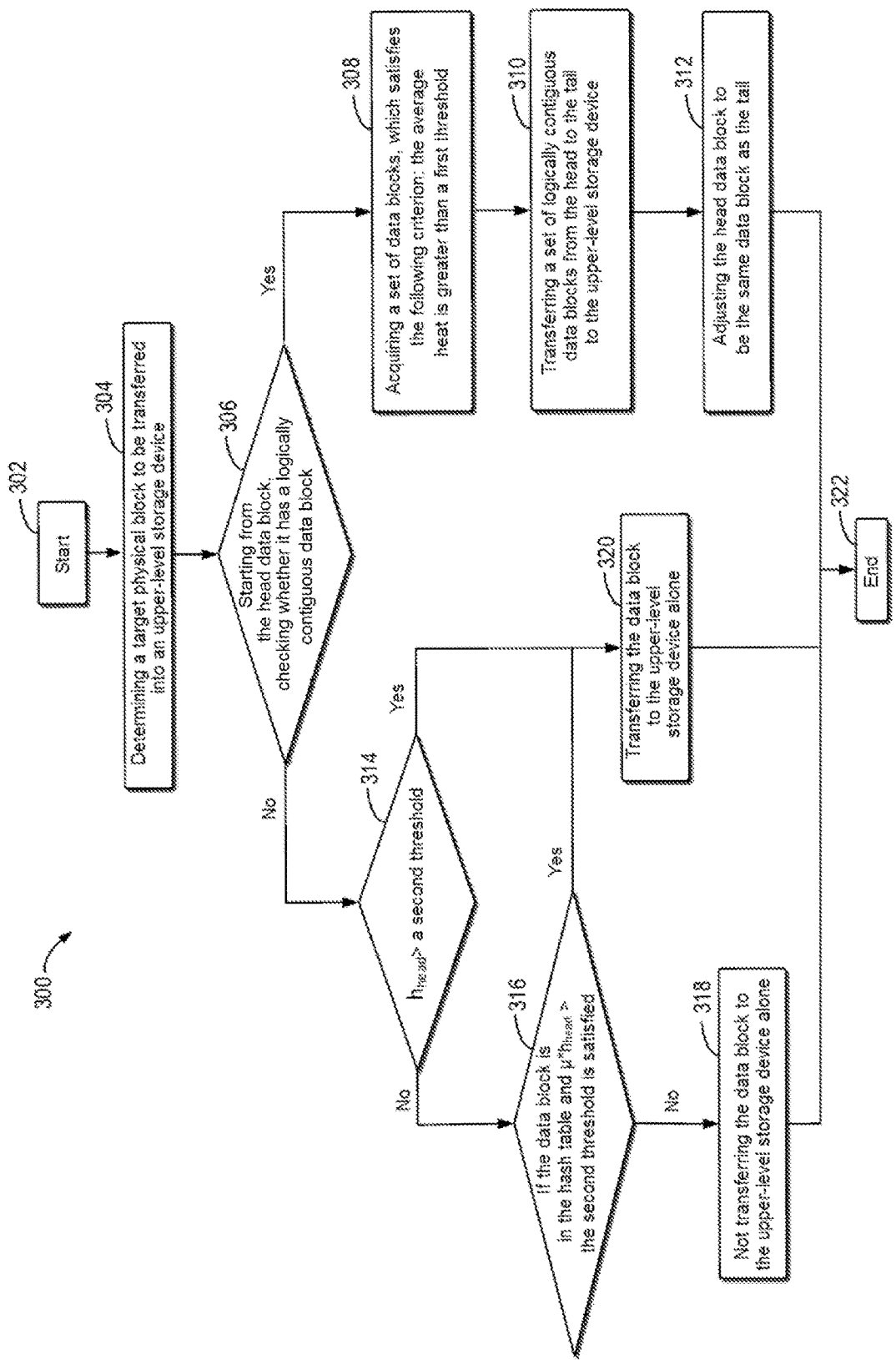
FIG. 3 illustrates a flow chart of an example method for transferring data according to an embodiment of the present disclosure.

As shown in FIG. 3, this process starts at block 302. At block 304, a target physical block, PB[n], n=1, 2, . . . , N, where N is a positive integer, to be transferred from a lower-level storage device to an upper-level storage device, for example, from an HDD level of a hybrid storage system to an SSD level, is determined. Then, at block 306, starting from the first data block of the target physical block, it is checked whether the first data block has a logically contiguous data block in the target physical block. If so, the process proceeds to block 308, where that data block is used as the head and tail, and then a set of data blocks are obtained by moving the tail based on whether the data block has a logically contiguous data block until the maximum number of contiguous data blocks is found, with the condition being satisfied that the average heat of the set of contiguous data blocks is greater than a first threshold. Here, the number of data blocks in this set of data blocks is max(tail−head), and the average heat=average($[h_{head}, h_{head+1}, \ldots, h_{tail-1}]$)=sum($[h_{head}, h_{head+1}, \ldots, h_{tail-1}]$)/(tail−head), where $h_{head}, h_{head+1}, \ldots,$ and $h_{tail-1}$ denote the heats of the data blocks head, head+1, . . . , tail−1; and where max( ) means obtaining the maximum value, average( ) means averaging, and sum( ) means summation. Then, at block 310, the set of logically contiguous data blocks from the head to the tail (excluding the tail) are transferred to the upper-level storage device such that this set of data blocks are transferred to the same physical block of the upper-level storage device. At block 312, the head data block is adjusted to be the same data block as the tail in order to then process the other data blocks within the target physical block.

At block 306, if the data block does not have a logically contiguous data block, it is determined at block 314 whether the heat of the data block is greater than a second threshold, and if it is greater than the second threshold, it indicates that this data block has a high heat and needs to be transferred to an upper-level storage device. Therefore, at block 320, this data block is transferred to the upper-level storage device alone. If the heat of the data block is smaller than or equal to the second threshold, then at block 316, it is necessary to further determine whether that data block is in a de-duplication hash table, and if the data block is in the de-duplication hash table, the heat thereof can be adjusted accordingly. At this point, that data block can be transferred to the upper-level storage device alone as long as the condition of $\mu*h_{head}$>the second threshold is satisfied. If the above condition is not satisfied, it indicates that the data is relatively cold and thus does not need to be transferred to the upper-level storage device, and, as shown at block 318, that data block is not transferred to the upper-level storage device alone. After processing all the data blocks in the physical block, the process ends at block 322.

The schematic diagram of the example flow for transferring data is described above in conjunction with FIG. 3, and schematic diagrams of data transfer examples according to embodiments of the present disclosure will be described below in conjunction with FIGS. 4A-4D.

Figure 4A:
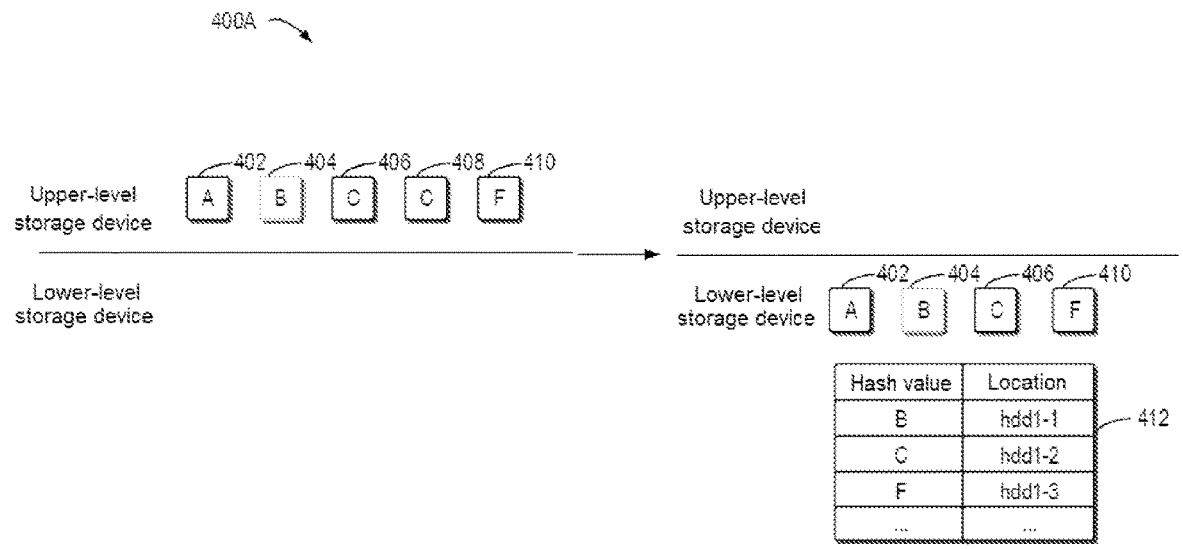
FIGS. 4A-4D illustrate schematic diagrams of data transfer examples according to embodiments of the present disclosure.

As shown in example 400A in FIG. 4A, data blocks having four different kinds of contents are used as candidate data blocks to be transferred from an upper-level storage device to a lower-level storage device, where data block 402 having data content A has a high compression ratio, data blocks 404, 406, 408, 410 having contents B, C, and F have low compression ratios, and data blocks 402, 404, and 406 are logically contiguous data blocks while data block 410 is not a logically contiguous data block. At the beginning, after data blocks 402, 404, 406, 408, and 410 are transferred from the upper-level storage device to the lower-level storage device, data blocks 404, 406, and 410 are selected in the lower-level storage device for de-duplication processing, the hash values thereof are added to de-duplication hash table 412, the location of storage of each data block is also stored in de-duplication hash table 412, and data blocks 402, 404, 406, and 410 are saved in the lower-level storage device.

Figure 4B:
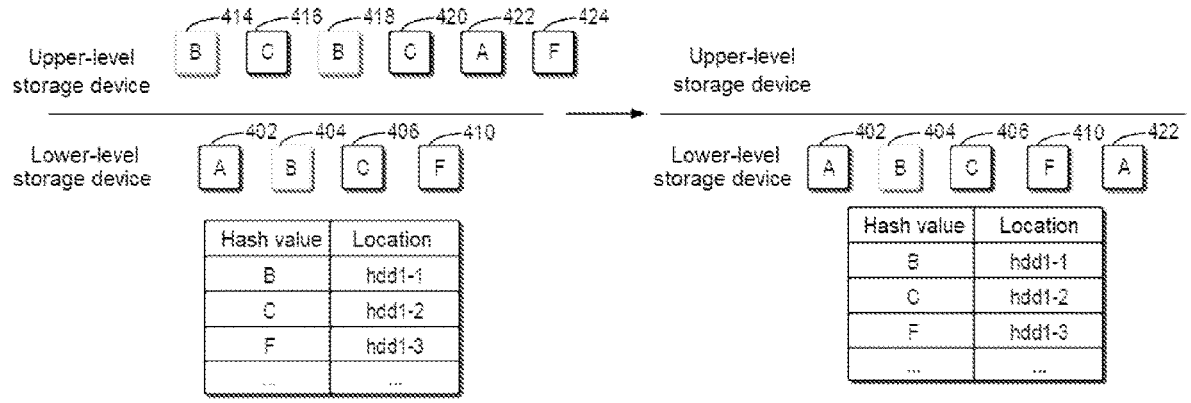
Figure 4C:
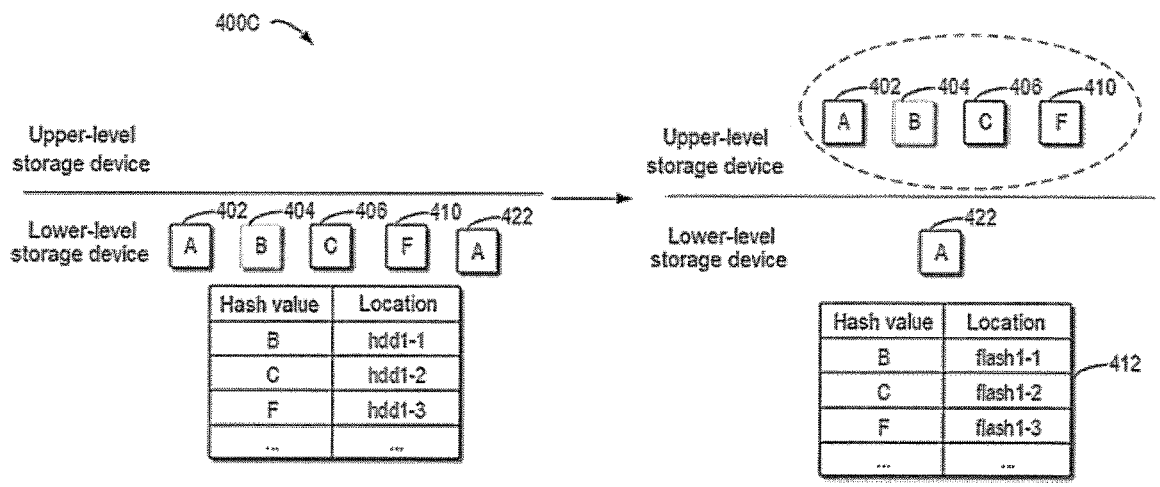

Next, as shown in example 400B in FIG. 4B, after FIG. 4A, with the passage of time, more data is transferred in and is subjected to de-duplication. The newly received data blocks 414, 416, 418, 420, 422, and 424 are subjected to de-duplication after transferred to the lower-level storage device. Since the data blocks including contents B, C, and F are already stored in the de-duplication hash table, these data blocks can be de-duplicated, while data block 422 is saved in the lower-level storage device since the content stored therein is not de-duplicated. If logical read accesses to target data blocks 402, 404, 406, and 410 are more frequent, data blocks 402, 404, 406, 410 become hotter at that point in time. As shown in FIG. 4C, these data 402, 404, 406, and 410 with a high heat will be moved from physical blocks of the lower-level storage device to physical blocks of the upper-level storage device.

As shown in example 400C of FIG. 4C, the hot target data blocks are moved from the lower-level storage device to the upper-level storage device. F is the target data block in the de-duplication hash table that satisfies the condition that $\mu$*hp is greater than the second threshold. Thus, a set of data blocks including contiguous data blocks 402, 404, and 406 as well as a single data block 410 are moved to the upper-level storage device during the transfer of data blocks. After the transfer is completed, the hash table is updated to keep track of the target data block in the upper-level storage device.

Figure 4D:
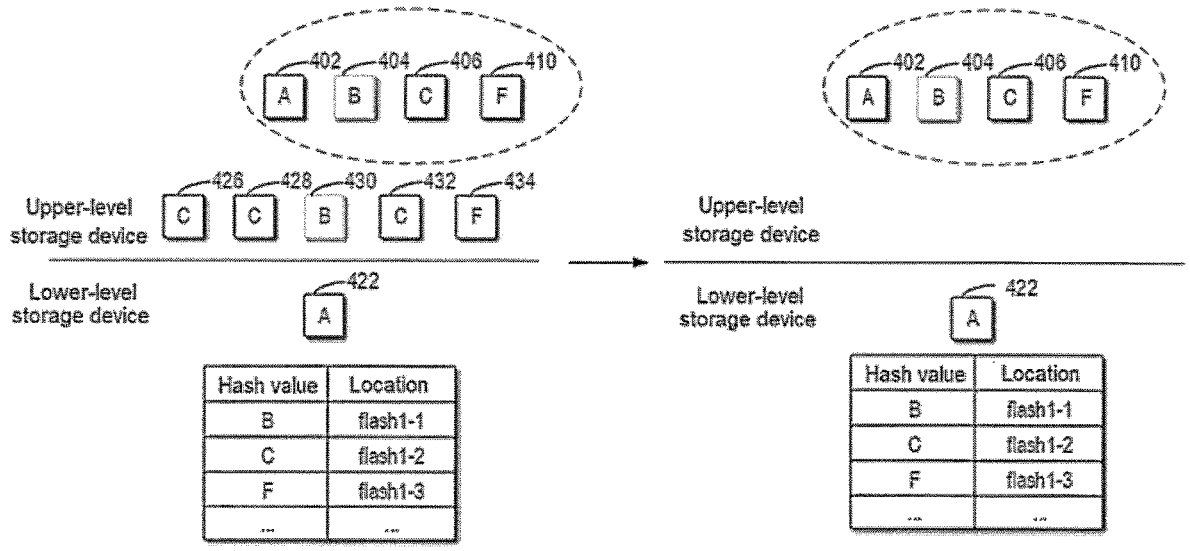

As shown in FIG. 4D, the read speed for data blocks 402, 404, 406, and 410 is higher after these blocks have been moved to the upper-level storage device, thus further improving the read performance. As data blocks 426, 428, 430, 432, and 434 continue to be transferred from the upper-level storage device to the lower level, they are de-duplicated through the de-duplication hash table based on their contents.

Figure 5:
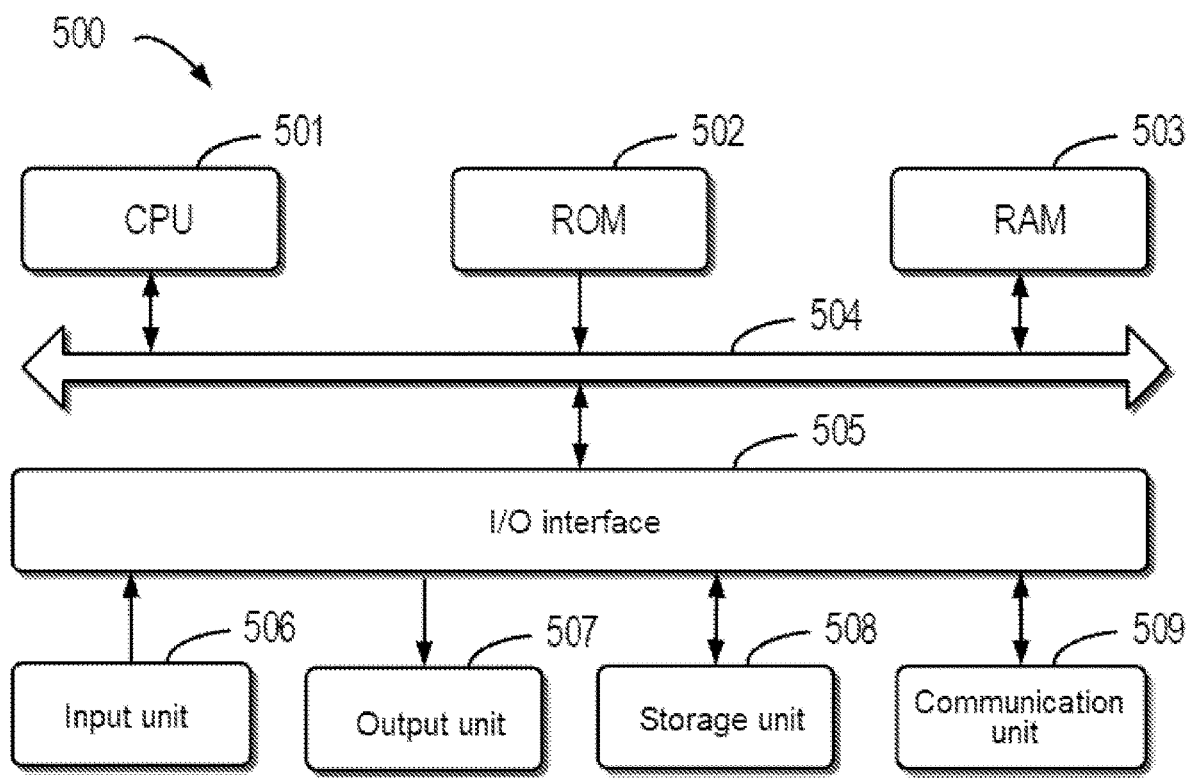
FIG. 5 illustrates a schematic block diagram of an example device suitable for implementing embodiments of the present disclosure.

FIG. 5 is a schematic block diagram of example device 500 that can be used to implement an embodiment of the present disclosure. Computing device 102 in FIG. 1 can be implemented using device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200 and method 300, may be performed by processing unit 501. For example, in some embodiments, methods 200 and 300 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more actions of methods 200 and 300 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

The invention claimed is:

1. A method for transferring data, comprising:
   determining a first physical block in a first storage device, the first physical block having a plurality of data blocks stored thereon;
   determining, based on a first data block of the plurality of data blocks, whether a set of logically contiguous data blocks that comprise the first data block exist in the first physical block, the set of logically contiguous data blocks having a target heat greater than a threshold heat; and
   transferring, in response to determining the existence of the set of logically contiguous data blocks in the first physical block, the set of logically contiguous data blocks into a second storage device for contiguous storage in a second physical block of the second storage device;
   determining a target hash value of the first data block in response to a second heat of the first data block being smaller than or equal to a second threshold heat;
   determining whether the target hash value is in a de-duplication hash table, wherein the de-duplication hash table stores hash values of data blocks that can be deduplicated;
   determining, in response to the target hash value being in the de-duplication hash table, whether an adjusted value of the second heat is greater than the second threshold heat; and
   transferring the first data block into the second storage device in response to the adjusted value of the second heat being greater than the second threshold heat.

2. The method according to claim 1, the threshold heat being a first threshold heat, wherein determining the first physical block comprises:
   determining a first heat of a data block in a candidate physical block in the first storage device, the first heat indicating how frequently the data block is accessed;
   determining a third heat of the candidate physical block based on the first heat of the data block, the third heat indicating how frequently the candidate physical block is accessed; and
   determining the candidate physical block as the first physical block in response to the third heat being greater than a third threshold heat.

3. The method according to claim 1, wherein determining whether the set of logically contiguous data blocks that comprise the first data block exist in the first physical block comprises:
   determining, based on the first data block, whether a second data block that is logically contiguous with the first data block exists in the first physical block; and
   acquiring, in response to the existence of the second data block in the first physical block, the set of logically contiguous data blocks that comprise the first data block in the first physical block.

4. The method according to claim 3, wherein acquiring the logically contiguous set of data blocks comprises:
   adding the first data block to the set of logically contiguous data blocks;

determining a reference heat for the set of logically contiguous data blocks and the second data block based on a heat of a data block in the set of logically contiguous data blocks and a heat of the second data block; and adding the second data block to the set of logically contiguous data blocks in response to the reference heat being greater than the threshold heat.

5. The method according to claim 3, further comprising:
determining a heat of each data block in the set of logically contiguous data blocks; and
determining an average value of a set of heats of the set of logically contiguous data blocks as the target heat.

6. The method according to claim 1, further comprising:
prior to transferring the first data block to the second storage device, determining a third the second heat of the first data block in response to the absence of the set of logically contiguous data blocks in the first physical block.

7. The method according to claim 1, further comprising:
not transferring the first data block into the second storage device in response to the target hash value not being in the de-duplication hash table or the adjusted value of the second heat being smaller than or equal to the second threshold heat.

8. The method according to claim 1, further comprising:
obtaining the adjusted value by amplifying the second heat by a predetermined multiple.

9. The method according to claim 1, further comprising:
updating, in response to the first data block being transferred to the second storage device, the de-duplication hash table using a location of storage of the first data block in the second storage device.

10. The method according to claim 1, wherein the first storage device has a longer device access time than the second storage device.

11. The method according to claim 1, wherein the target heat and the second heat are data block heat metrics; and
wherein the method further comprises:
determining a physical block heat of the first physical block, the physical block heat being a physical block metric different from the data block heat metrics.

12. An electronic device, comprising:
at least one processor; and
a memory coupled to the at least one processor and having instructions stored therein, wherein the instructions, when executed by the at least one processor, cause the device to perform actions comprising:
determining a first physical block in a first storage device, the first physical block having a plurality of data blocks stored thereon;
determining, based on a first data block of the plurality of data blocks, whether a set of logically contiguous data blocks that comprise the first data block exist in the first physical block, the set of logically contiguous data blocks having a target heat greater than a threshold heat; and
transferring, in response to determining the existence of the set of logically contiguous data blocks in the first physical block, the set of logically contiguous data blocks into a second storage device for contiguous storage in a second physical block of the second storage device;
determining a target hash value of the first data block in response to a second heat of the first data block being smaller than or equal to a second threshold heat;

determining whether the target hash value is in a de-duplication hash table, wherein the de-duplication hash table stores hash values of data blocks that can be deduplicated;
determining, in response to the target hash value being in the de-duplication hash table, whether an adjusted value of the second heat is greater than the second threshold heat; and
transferring the first data block into the second storage device in response to the adjusted value of the second heat being greater than the second threshold heat.

13. The electronic device according to claim 12, the threshold heat being a first threshold heat, wherein determining the first physical block comprises: determining a first heat of a data block in a candidate physical block in the first storage device, the first heat indicating how frequently the data block is accessed; determining a third heat of the candidate physical block based on the first heat of the data block, the third heat indicating how frequently the candidate physical block is accessed; and determining the candidate physical block as the first physical block in response to the third heat being greater than a third threshold heat.

14. The electronic device according to claim 12, wherein determining whether the set of logically contiguous data blocks that comprise the first data block exist in the first physical block comprises:
determining, based on the first data block, whether a second data block that is logically contiguous with the first data block exists in the first physical block; and
acquiring, in response to the existence of the second data block in the first physical block, the set of logically contiguous data blocks that comprise the first data block in the first physical block.

15. The electronic device according to claim 14, wherein acquiring the set of logically contiguous data blocks comprises:
adding the first data block to the set of logically contiguous data blocks;
determining a reference heat for the set of logically contiguous data blocks and the second data block based on a heat of a data block in the set of logically contiguous data blocks and a heat of the second data block; and
adding the second data block to the set of logically contiguous data blocks in response to the reference heat being greater than the threshold heat.

16. The electronic device according to claim 14, wherein the actions further comprise:
determining a heat of each data block in the set of logically contiguous data blocks; and
determining an average value of a set of heats of the set of logically contiguous data blocks as the target heat.

17. The electronic device according to claim 12, wherein the actions further comprise:
prior to transferring the first data block to the second storage device, determining the second heat of the first data block in response to the absence of the set of logically contiguous data blocks in the first physical block.

18. The electronic device according to claim 12, wherein the actions further comprise:
not transferring the first data block into the second storage device in response to the target hash value not being in the de-duplication hash table or the adjusted value of the second heat being smaller than or equal to the second threshold heat.

19. The electronic device according to claim 12, wherein the target heat and the second heat are data block heat metrics; and wherein the actions further include:
determining a physical block heat of the first physical block, the physical block heat being a physical block metric different from the data block heat metrics.

20. A computer program product having a non-transitory computer readable medium which stores a set of instructions to transfer data; the set of instructions, when carried out by computerized circuitry, causing the computerized circuitry to perform a method of:

determining a first physical block in a first storage device, the first physical block having a plurality of data blocks stored thereon;

determining, based on a first data block of the plurality of data blocks, whether a set of logically contiguous data blocks that comprise the first data block exist in the first physical block, the set of logically contiguous data blocks having a target heat greater than a threshold heat; and transferring, in response to determining the existence of the set of logically contiguous data blocks in the first physical block, the set of logically contiguous data blocks into a second storage device for contiguous storage in a second physical block of the second storage device;

determining a target hash value of the first data block in response to a second heat of the first data block being smaller than or equal to a second threshold heat;

determining whether the target hash value is in a de-duplication hash table, wherein the de-duplication hash table stores hash values of data blocks that can be deduplicated;

determining, in response to the target hash value being in the de-duplication hash table, whether an adjusted value of the second heat is greater than the second threshold heat; and transferring the first data block into the second storage device in response to the adjusted value of the second heat being greater than the second threshold heat.

* * * * *